US009579803B2

(12) United States Patent
Tsai et al.

(10) Patent No.: US 9,579,803 B2
(45) Date of Patent: Feb. 28, 2017

(54) POWER APPARATUS HAVING PLURAL ROTARY MOTORS

(71) Applicant: DELTA ELECTRONICS, INC., Taoyuan Hsien (TW)

(72) Inventors: Ching-Hsiung Tsai, Taoyuan Hsien (TW); Hong-Cheng Sheu, Taoyuan Hsien (TW); Chi-Wen Chung, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 304 days.

(21) Appl. No.: 14/224,131

(22) Filed: Mar. 25, 2014

(65) Prior Publication Data
US 2014/0305246 A1 Oct. 16, 2014

(30) Foreign Application Priority Data

Apr. 15, 2013 (TW) .............................. 102113278 A
Jan. 29, 2014 (TW) .............................. 103103387 A (51) Int. Cl.
| | | |
|---|---|---|
| *B25J 9/12* | (2006.01) | |
| *B25J 18/00* | (2006.01) | |
| *H02K 21/14* | (2006.01) | |
| *H02K 1/14* | (2006.01) | |
| *H02K 16/00* | (2006.01) | |
| *H02K 16/02* | (2006.01) | |

(52) U.S. Cl.
CPC ............... *B25J 18/00* (2013.01); *B25J 9/126* (2013.01); *H02K 1/14* (2013.01); *H02K 16/00* (2013.01); *H02K 16/025* (2013.01); *H02K 21/14* (2013.01); *Y10T 74/20317* (2015.01)

(58) Field of Classification Search
CPC ........ B25J 9/009; B25J 9/0087; B25J 9/0027; B25J 9/0024; B25J 9/0003; B25J 18/002; B25J 17/00
USPC ......................................... 310/195, 112–114
See application file for complete search history.

(56) References Cited

U.S. PATENT DOCUMENTS

| | | | |
|---|---|---|---|
| 1,723,912 A | 8/1929 | Bergman | |
| 5,085,556 A | 2/1992 | Ohtomi | |
| 5,523,662 A * | 6/1996 | Goldenberg | ............... B25J 9/06 318/568.11 |
| 5,729,071 A | 3/1998 | Steiner | |
| 5,880,551 A * | 3/1999 | Prudham | ................... G01R 7/06 310/156.43 |
| 6,043,574 A * | 3/2000 | Prudham | ................... G01R 7/06 310/156.64 |
| 7,030,518 B2 | 4/2006 | Tsuboi et al. | |
| 7,358,629 B2 * | 4/2008 | Yamamoto | ............. H02K 1/141 310/190 |
| 7,372,179 B2 * | 5/2008 | Chiang | ................... H02K 3/524 310/49.31 |

(Continued)

FOREIGN PATENT DOCUMENTS

| | | |
|---|---|---|
| JP | 02-094439 | 7/1990 |
| JP | 08-191563 | 7/1996 |

(Continued)

*Primary Examiner* — Naishadh Desai
(74) *Attorney, Agent, or Firm* — Hauptman Ham, LLP (57) ABSTRACT

A rotary motor includes a rotor and at least one stator. The rotor has a shaft. The stator has an iron core and a coil wound around the iron core. A cross section of the iron core perpendicular to the shaft has a long axis and a short axis, and the rotor is disposed on an extension line of the long axis.

3 Claims, 8 Drawing Sheets

(56) References Cited

U.S. PATENT DOCUMENTS

| | | | | |
|---|---|---|---|---|
| 7,714,474 B2* | 5/2010 | Yoshikawa | ............ | H02K 1/146 310/216.001 |
| 8,084,913 B2* | 12/2011 | Telep | ..................... | H02K 37/14 310/216.018 |
| 2001/0005934 A1 | 7/2001 | Nakamura et al. | | |
| 2002/0050760 A1 | 5/2002 | Kinashi et al. | | |
| 2010/0314962 A1 | 12/2010 | Shiga | | |

FOREIGN PATENT DOCUMENTS

| | | |
|---|---|---|
| JP | 2002-136090 | 5/2002 |
| JP | 2005-341704 | 12/2005 |
| JP | 2010-288426 | 12/2010 |
| JP | 2013013964 | 1/2013 |
| TW | 215502 | 11/1993 |
| TW | 260838 | 10/1995 |
| TW | 380329 | 1/2000 |
| TW | 200514334 | 4/2005 |
| TW | I275228 | 3/2007 |
| WO | WO 0145235 | 6/2001 |

* cited by examiner

POWER APPARATUS HAVING PLURAL ROTARY MOTORS

RELATED APPLICATIONS

This application claims priority to Taiwan Application Serial Number 102113278, filed Apr. 15, 2013 and Taiwan Application Serial Number 103103387, filed on Jan. 29, 2014. The entirety of the above-mentioned patent applications are hereby incorporated via reference herein and made a part of specification.

BACKGROUND

Field of Invention

The present invention relates to robot arm technology. More particularly, the present invention relates to a rotary motor, a power apparatus, and a robot arm.

Description of Related Art

Figure 1:
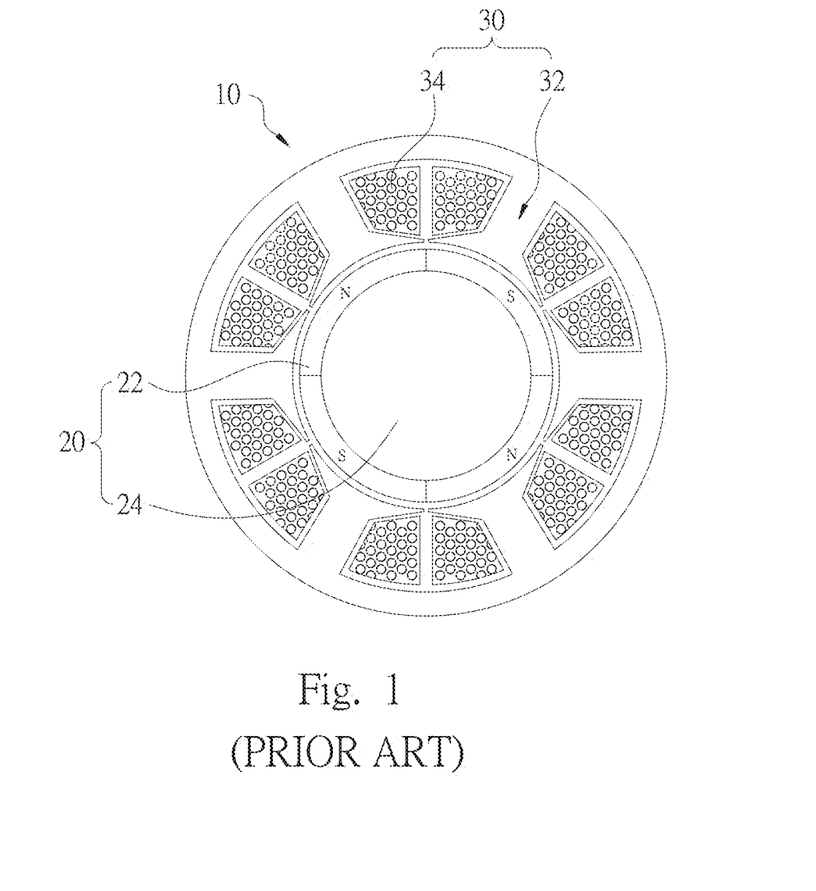
FIG. 1 is a schematic diagram of a traditional rotary motor.

The rotary motor is the main power source in electromechanical systems. FIG. 1 is a schematic diagram of a traditional rotary motor. The rotary motor 10 includes a rotor 20 and a stator 30. The rotor 20 includes a magnet 22 and a shaft 24. The stator 30 includes an iron core 32 and a coil 34. The iron core 32 is in the form of an annulus, and the rotor 20 is located in the central cavity of the annular iron core 32. Thus, the rotary motor 10 is typically rectangular or a circular.

However, in the configuration of an electromechanical system, if the installation space for the rotary motor is neither rectangular nor circular, in use, limitations will be encountered with respect to the shape of the rotary motor, such that the utilization of the equipment space cannot be optimized.

SUMMARY

The present invention provides a rotary motor which optimizes the utilization of space.

An aspect of the invention provides a rotary motor. The rotary motor includes a rotor and at least one stator. The rotor has a shaft. The stator has an iron core and a coil wound around the iron core, in which a cross section of the iron core perpendicular to the shaft has a long axis and a short axis, and the rotor is disposed on an extension line of the long axis.

In one or more embodiments, the cross section can be rectangular or curved in shape.

In one or more embodiments, the quantity of stators is two, and an angle between the stators is about 180 degrees.

In one or more embodiments, the quantity of stators is three, and an angle between adjacent two of the stators is about 120 degrees.

In one or more embodiments, the rotary motor further includes a case, and the stator and the rotor are located in the case.

Another aspect of the invention provides a power apparatus. The power apparatus includes a plurality of rotary motors, in which each of the rotary motors includes a rotor and at least one stator. The rotor has a shaft. The stator has an iron core and a coil wound around the iron core, in which the cross section of the stator perpendicular to the shaft has a long axis and a short axis, and the rotor is disposed on the extension line of the long axis.

In one or more embodiments, the cross section can be rectangular, and the rotary motors are in a horizontal arrangement.

In one or more embodiments, the cross section can be curved in shape, and the rotary motors are in an annular arrangement.

In one or more embodiments, the power apparatus further includes a case, and the rotary motors are disposed in the case.

Another aspect of the invention provides a robot arm. The robot arm includes a series of a plurality of rotary motors aforementioned, in which the quantity of stator in each rotary motor is one, and the cross section of the stator rectangular in shape.

In one or more embodiments, dimensions of the rotary motors can be increasingly reduced in sequence.

The shape of the stator and the relative position of the stator and the rotor of the rotary motor can be adjusted in the present disclosure, such that the rotary motor, and the power apparatus and the robot arm using the same may achieve a higher level of space utilization. Furthermore, a more flexible space utilization of the rotary motor, and the power apparatus and the robot arm using the same can be realized.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

The shape of a stator and the relative positions of the stator and a rotor of a rotary motor can be adjusted in the present disclosure, such that the rotary motor, and a power apparatus and a robot arm using the same may achieve a higher level of space utilization. Furthermore, a more flexible space utilization of the rotary motor, and the power apparatus and the robot arm using the same can be realized.

Figure 2:
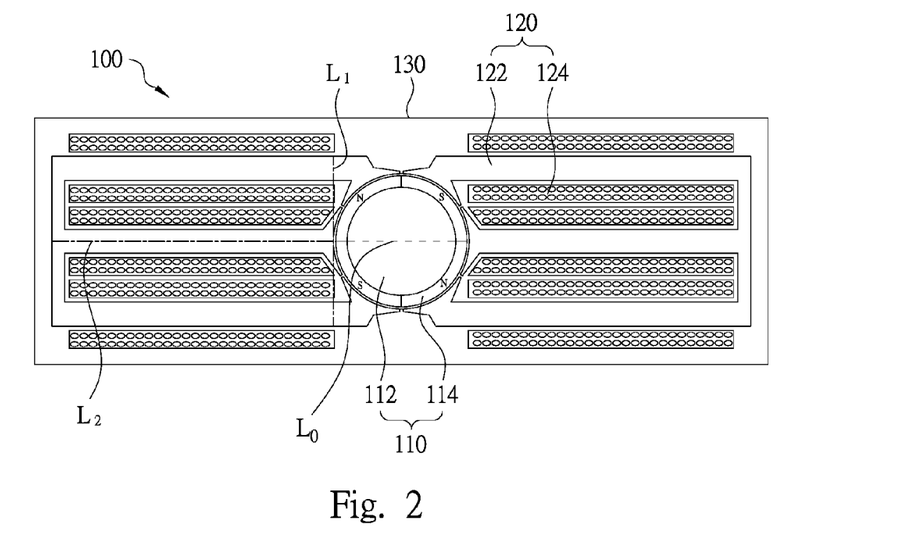
FIG. 2-3 are cross-sectional schematic views of different embodiments of a rotary motor of the invention.

FIG. 2 is a cross-sectional schematic view of an embodiment of a rotary motor of the invention. The rotary motor 100 comprises a rotor 110 and a plurality of stators 120. The rotor 110 comprises a shaft 112 and a plurality of magnets 114, and the magnets 114 are disposed on the surface of the shaft 112 with the polarities staggered. The quantity of the stators 120 in this embodiment is two, and the stators 120 are located respectively on opposite sides of the rotor 110.

Each of the stators 120 comprises an iron core 122 and a coil 124 wound around the iron core 122. In this embodiment, the rotary motor 100 is utilized in a 3-phase motor, and thus the quantity of magnetic poles of the iron core 120 and of the corresponding coil 124 are both three. When electricity is supplied to the coil 124 of stator 120, magnetic forces are generated. The rotor 110 is rotated by the electromagnetic effect between the stator 120 and the rotor 110.

Unlike traditional annular stators, the shape of each of the stators 120 in this embodiment is rectangular, rather than annular. Specifically, the iron core 122 of stator 120 has a first axis $L_1$ and a second axis $L_2$ in the cross section perpendicular to the shaft 112. The first axis $L_1$ is tangential to the shaft 112. Namely, the first axis $L_1$ is a straight line that touches the outside of a curve of the shaft 112 but does not cut across it. Furthermore, the first axis $L_1$ is perpendicular to the iron core 122 at the terminals of the first axis $L_1$. The second axis $L_2$ crosses the first axis $L_1$. The second axis $L_2$ is perpendicular to the iron core 122 at the terminals of the second axis $L_2$. In this embodiment, the second axis $L_2$ and the first axis $L_1$ are substantially perpendicular to each other, and the length of the iron core 122 along the first axis $L_1$ is shorter than the length of the iron core 122 along the second axis $L_2$. The rotor 110 is disposed on an extension line $L_0$ of the second axis $L_2$. In this embodiment, the two stators 120 are located respectively on opposite sides of the rotor 110, and the angle between the two stators 120 is about 180 degrees. The two stators 120 and the rotor 110 are horizontally arranged to form a long strip.

The rotary motor 100 further comprises a case 130 for matching with the design of the stator 120 and the rotor 110. Corresponding to the formation of the rotor 110 and stator 120 as a long strip, the case 130 is also in the form of a long strip. In other words, the rotary motor 100 is in the shape of a long strip in this embodiment for utilization in a long strip type of space.

The rotary motor 100 may have different appearances by suitably changing the shape of the stators 120 and the relative positions of the stators 120 and the rotor 110. Examples of various embodiments are illustrated and discussed below.

Figure 3:
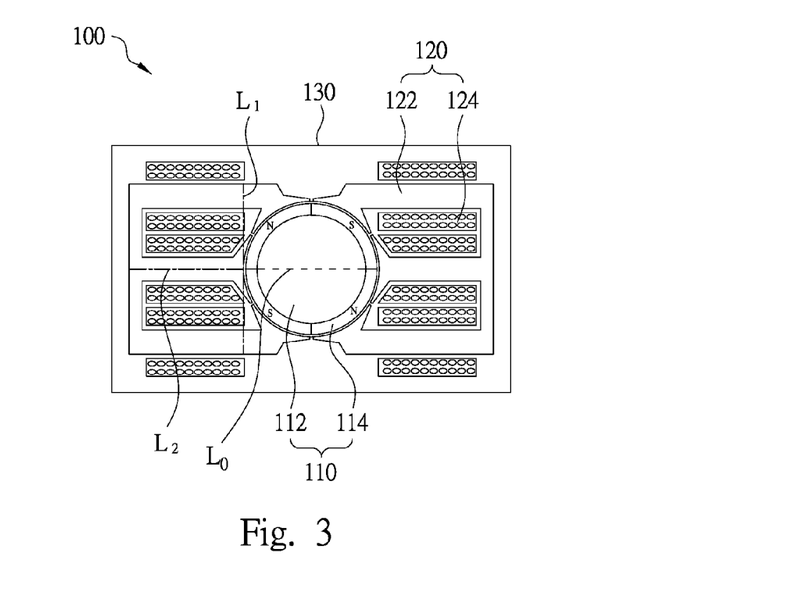

FIG. 3 is a cross-sectional schematic view of another embodiment of the rotary motor of the invention. The rotary motor 100 comprises the rotor 110 and the stators 120. The rotor 110 has the shaft 112, and each of the stators 120 comprises the iron core 122 and the coil 124 wound around the iron core 122. The cross section of the iron core 122 perpendicular to the shaft 112 has the first axis $L_1$ being tangential to the shaft 112, and the second axis $L_2$ crossing the first axis $L_1$. The rotor 110 is disposed on the extension line $L_0$ of the second axis $L_2$ of the stator 120.

Figure 4:
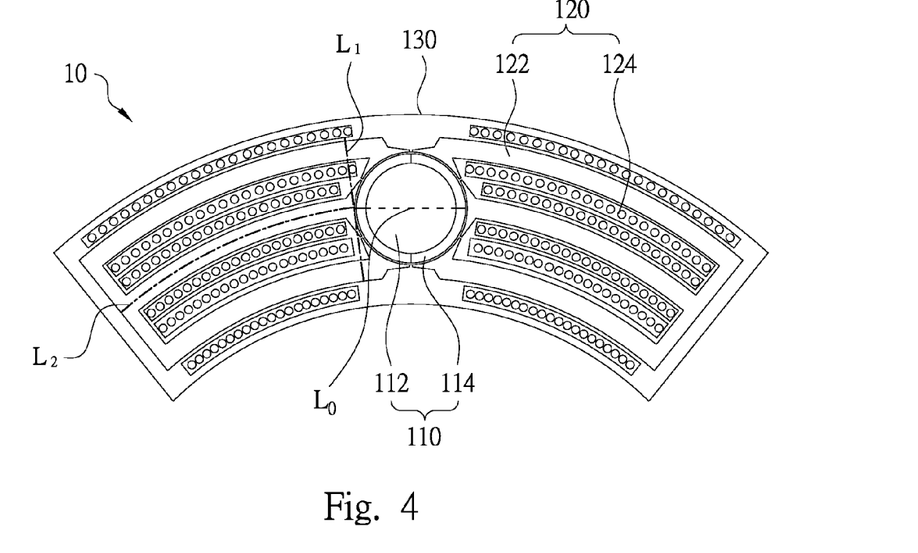
FIGS. 4-6 are cross-sectional schematic views of different embodiments of the rotary motor of the invention.

In this embodiment, two stators 120 are disposed at opposite sides of the rotor 110. The first axis $L_1$ is perpendicular to the second axis $L_2$, and the length of the iron core 122 along the first axis $L_1$ is longer than the length of the iron core 122 along the second axis $L_2$. FIG. 4 is a cross-sectional schematic view of another embodiment of the rotary motor of the invention. The rotary motor 100 comprises the rotor 110 and the stators 120. The rotor 110 has the shaft 112, and each of the stators 120 comprises the iron core 122 and the coil 124 wound around the iron core 122. The cross section of the iron core 122 perpendicular to the shaft 112 has the first axis $L_1$ being tangential to the shaft 112 and the second axis $L_2$ crossing the first axis $L_1$. The rotor 110 is disposed on the extension line $L_0$ of the second axis $L_2$ of the stator 120.

In this embodiment, the quantity of the stators 120 is two. The cross section of each of the stators 120 perpendicular to the shaft 112 forms a curved shape (similar to a sector), and the two stators 120 are located respectively on two opposite sides of rotor 110, such that the two stators 120 and the rotor 110 there between form another curved structure (similar to a sector).

The rotary motor 100 comprises the case 130, and the rotor 110 and the stators 120 are disposed in the case 130. The case 130 is also curved shape (similar to a sector), corresponding to the appearance of rotor 110 and stators 120.

Figure 5:
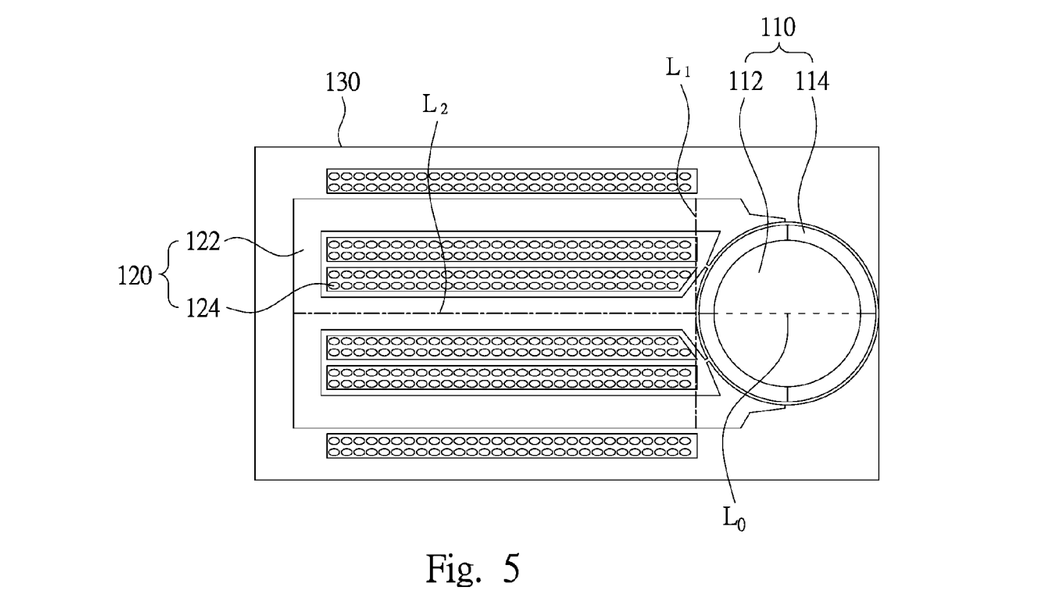

FIG. 5 is a cross-sectional schematic view of another embodiment of the rotary motor of the invention. The rotary motor 100 comprises the rotor 110 and the stator 120. The rotor 110 has the shaft 112, and the stator 120 comprises the iron core 122 and the coil 124 wound around the iron core 122. The cross section of the iron core 122 perpendicular to the shaft 112 has the first axis $L_1$ being tangential to the shaft 112 and the second axis $L_2$ crossing the first axis $L_1$. The rotor 110 is disposed on the extension line $L_0$ of the second axis $L_2$ of the stator 120.

In this embodiment, the quantity of the stator 120 is one, and the length of the iron core 122 along the first axis $L_1$ can be shorter or larger than the length of the iron core 122 along the second axis $L_2$. The shape of the cross section of the stator 120 perpendicular to the shaft 112 can be rectangular or curved. The stator 120 is disposed at a side of the rotor 110. The case 130 can be in a corresponding rectangular or curve shape.

Figure 6:
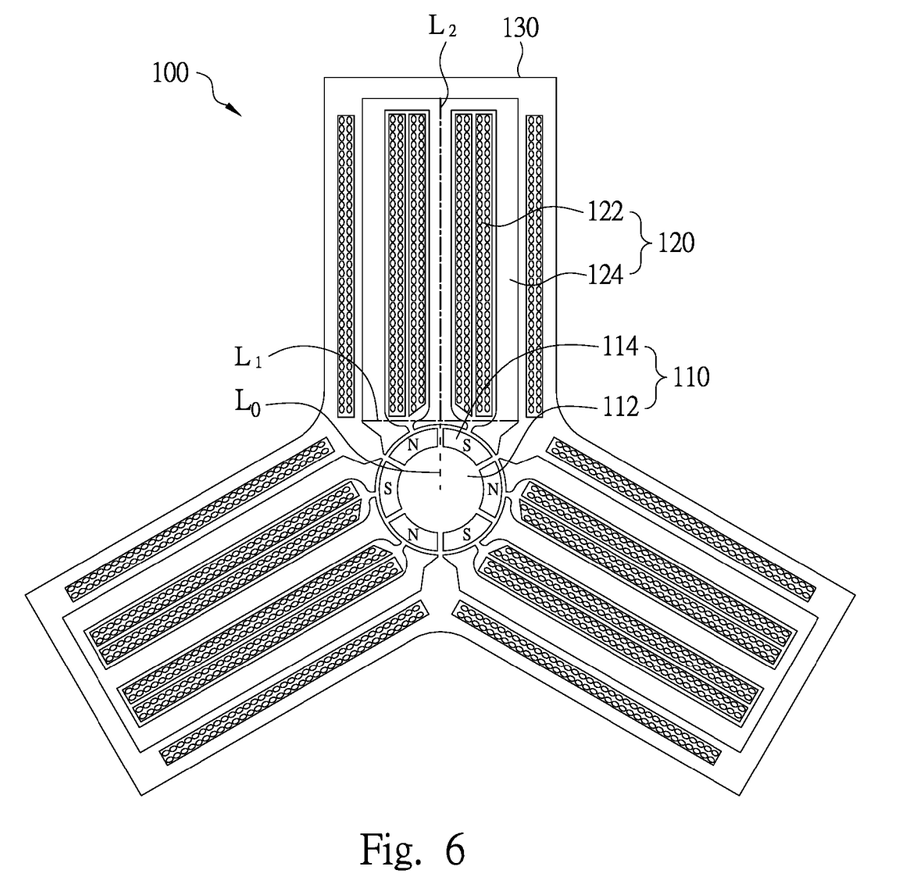

FIG. 6 is a cross-sectional schematic view of yet another embodiment of the rotary motor of the invention. The rotary motor 100 comprises the rotor 110 and the stators 120. The rotor 110 has the shaft 112, and each of the stators 120 comprises the iron core 122 and the coil 124 wound around the iron core 122. The cross section of the iron core 122 perpendicular to the shaft 112 has the first axis $L_1$ being tangential to the shaft 112, and the second axis $L_2$ crossing the first axis $L_1$. The rotor 110 is disposed on the extension line $L_0$ of the second axis $L_2$ of the stators 120.

In this embodiment, the cross section of the stators 120 perpendicular to the shaft 112 forms a rectangle, and the quantity of the stators 120 is three. Each of the stators 120 extends from the rotor 110 in a radial manner, and the angle between any two of the stators 120 that are adjacent to each other is about 120 degrees. The shape of the case 130 corresponding to the rotor 110 and the stators 120 corresponds to the combined shape of the rotor 110 and the stators 120 described above and shown in FIG. 6.

As is evident from the embodiments mentioned above, the rotary motor 100 provided in this invention can correspond to different requirements with respect to installation space. The shape of the stator(s) 120 and the relative positions of the stator(s) 120 and the rotor 110 can be changed for achieving a higher level of space utilization. Furthermore, the rotary motor 100 may have a bigger space for disposing the iron core 122 and the coil 124 to result in better electromechanical properties.

Persons of ordinary skill in the art should be able to change the shape of the stator(s) 120 and the relative positions of the stator(s) 120 and the rotor 110 according to actual requirements, and the present invention is not limited by the aforementioned embodiments.

Furthermore, a plurality of the rotary motors 100 mentioned above can be used in parallel, forming a relatively large power apparatus. Embodiments are illustrated and discussed below.

Figure 7:
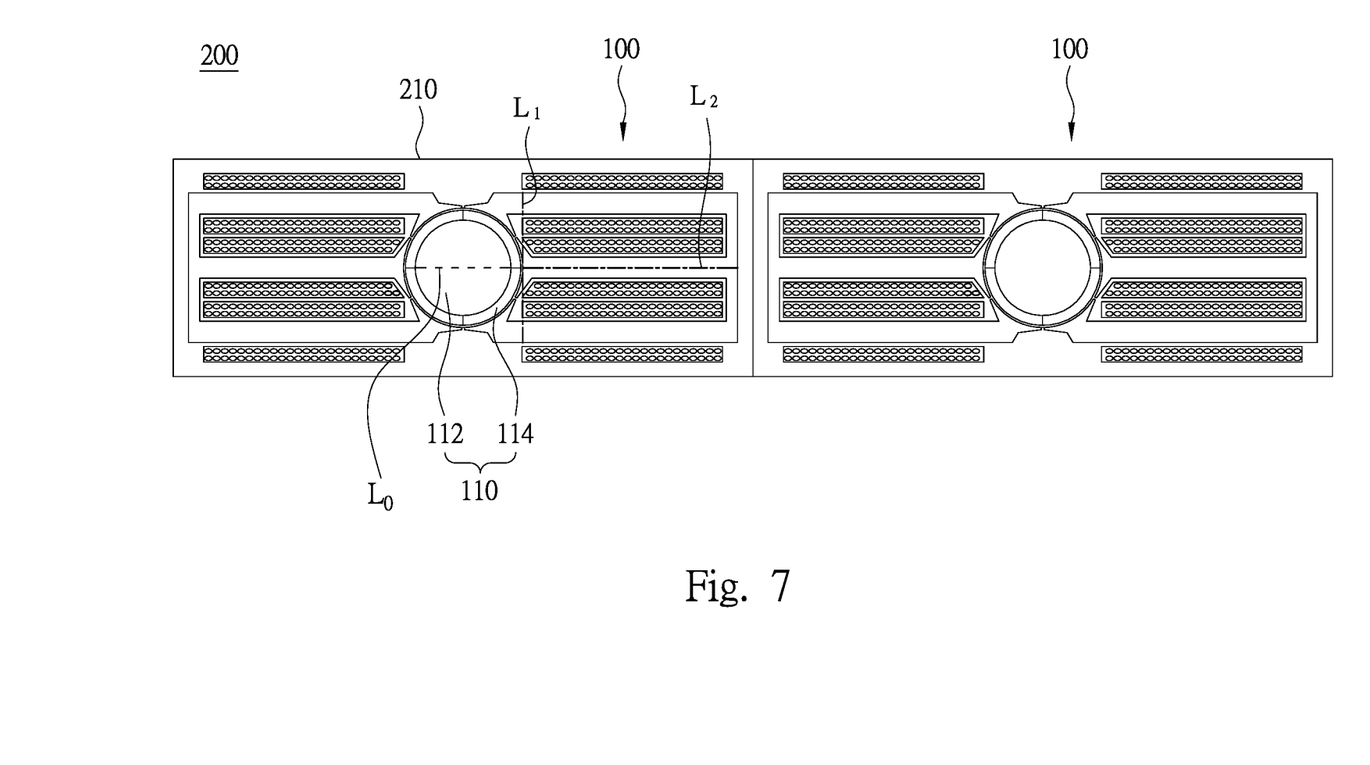
FIG. 7 and FIG. 8 are cross-sectional schematic views of different embodiments of a power apparatus of the invention.

FIG. 7 is a cross-sectional schematic view of an embodiment of a power apparatus of the invention. The power apparatus 200 comprises a plurality of the rotary motors 100 as shown in FIG. 2, in which each rotary motor 100 comprises two stators 120 and one rotor 110. The cross section of the iron core 122 perpendicular to the rotor 110 has the first axis $L_1$ being tangential to the shaft, and the second axis $L_2$ crossing the first axis $L_1$. The rotor 110 is located on the extension line $L_0$ of the second axis $L_2$ of the stators 120. The cross section of the two stators 120 perpendicular to the shaft 112 forms a rectangle, and the two stators 120 are located respectively on two opposite sides of the rotor 110. These rotary motors 100 can be arranged horizontally to thereby form the power apparatus 200 in a long strip configuration. The power apparatus 200 comprises a case 210, and the rotary motors 100 are disposed in the case 210.

Figure 8:
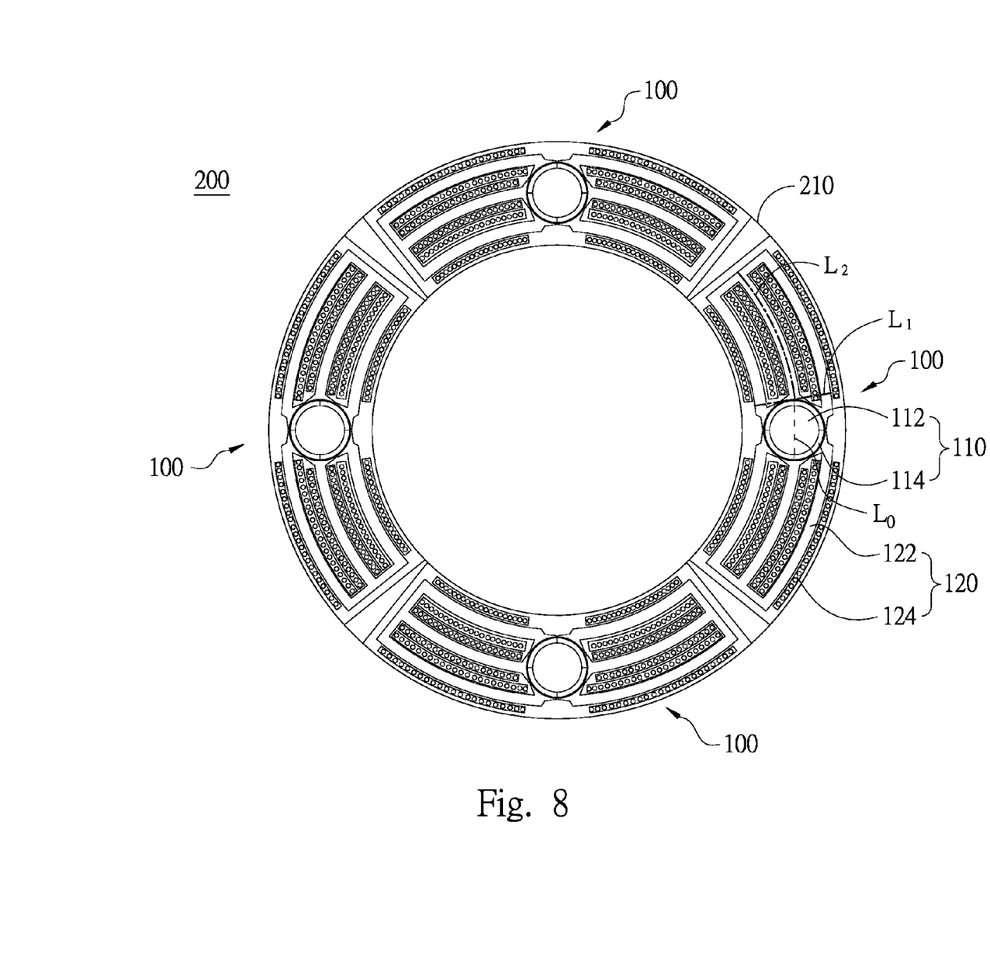

Alternatively, FIG. 8 is a cross-sectional schematic view of another embodiment of the power apparatus of the invention. The power apparatus 200 comprises a plurality of the rotary motors 100 as shown in FIG. 4, in which each rotary motor 100 comprises two stators 120 and one rotor 110. The cross section of the iron core 122 perpendicular to the rotor 110 has the first axis $L_1$ being tangential to the shaft 112, and the second axis $L_2$ crossing the first axis $L_1$. The rotor 110 is located on the extension line $L_0$ of the second axis $L_2$ of stator 120. The cross section of the two stators 120 perpendicular to the shaft 112 forms a curve (similar to a sector), and the two stators 120 are located respectively on two sides of rotor 110. These rotary motors 100 can be arranged continuously in an end-to-end configuration to thereby form the power apparatus 200 in an annular shape. The case 210 of the power apparatus 200 can be a hollow ring, and the rotary motors 100 are disposed in the annular case 210.

Figure 9:
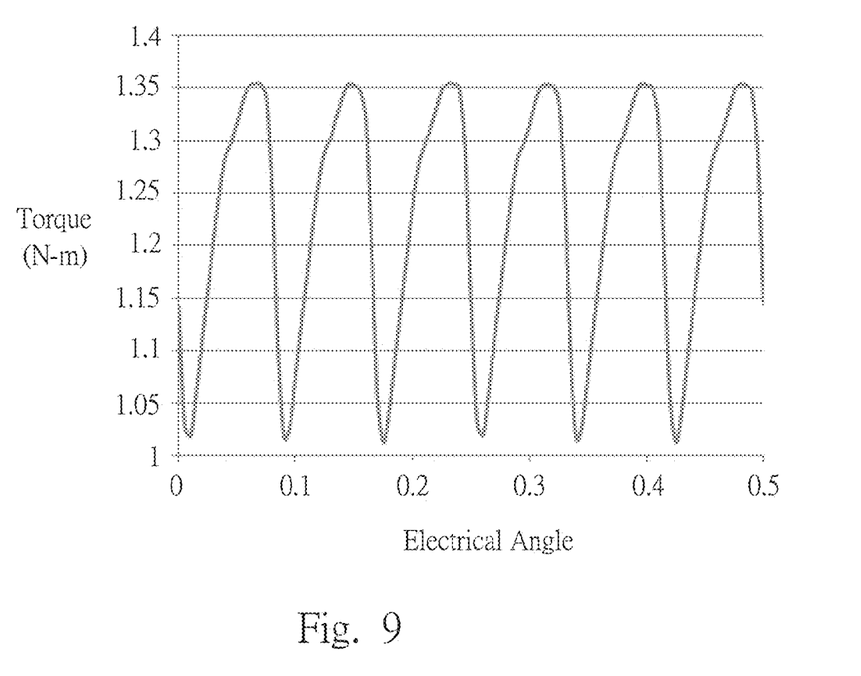
FIG. 9 and FIG. 10 are output torque diagrams of the power apparatus in FIG. 8 under different phase angle configurations.
Figure 10:
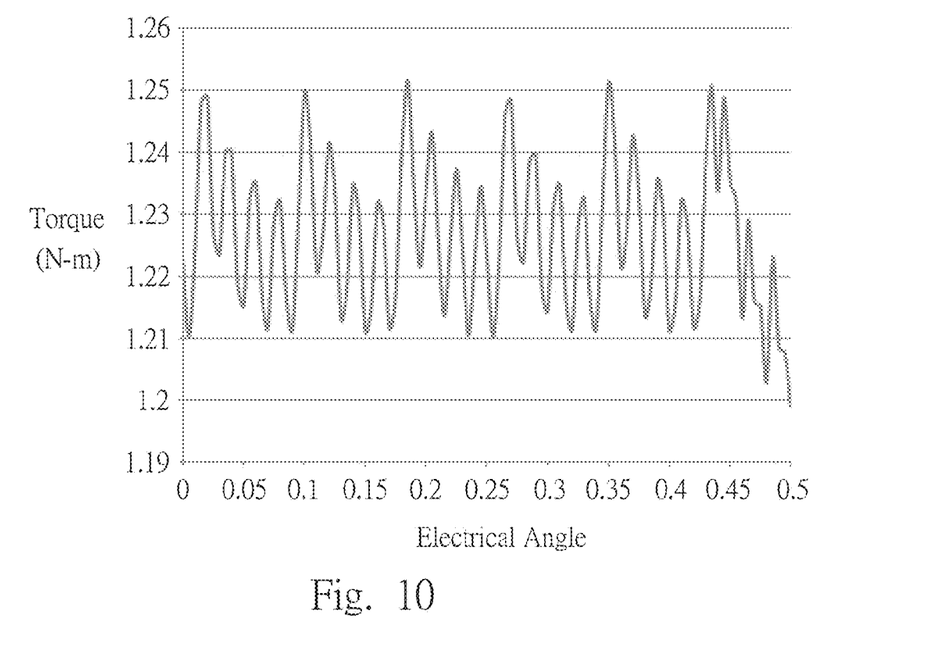

FIG. 9 and FIG. 10 are output torque diagrams of the power apparatus in FIG. 8 under different phase angle configurations. When a plurality of the rotary motors 100 are used to form the power apparatus 200 as shown in FIG. 8, if the phase angle among the rotary motors 100 is not designed, such that all the rotary motors 100 have the same phase angle, the output torque diagram of the power apparatus 200 is as shown in FIG. 9, in which the output torque exhibits an obvious cogging force.

Thus, this embodiment further adjusts the phase angle between each rotary motor 100, such that there are phase angle differences to reduce the generation of cogging force. Specifically, the phase angle difference between each rotary motor 100 is the cycle of cogging force (electrical angle) divided by the number of rotary motors 100 arranged in parallel. The output torque diagram of the power apparatus 200 in FIG. 8 after such adjustment of phase angle is shown in FIG. 10, in which the output torque does not exhibit any obvious cogging force.

In summary, a plurality of the rotary motors 100 arranged in parallel can form another power apparatus 200, and persons of ordinary skill in the art should be able to vary the shape of the stators 120 and the arrangement among the rotary motors 100 according to actual requirements, so that space utilization is made more flexible. The phase angle among the rotary motors 100 can be adjusted to reduce the effect of cogging force.

Figure 11:
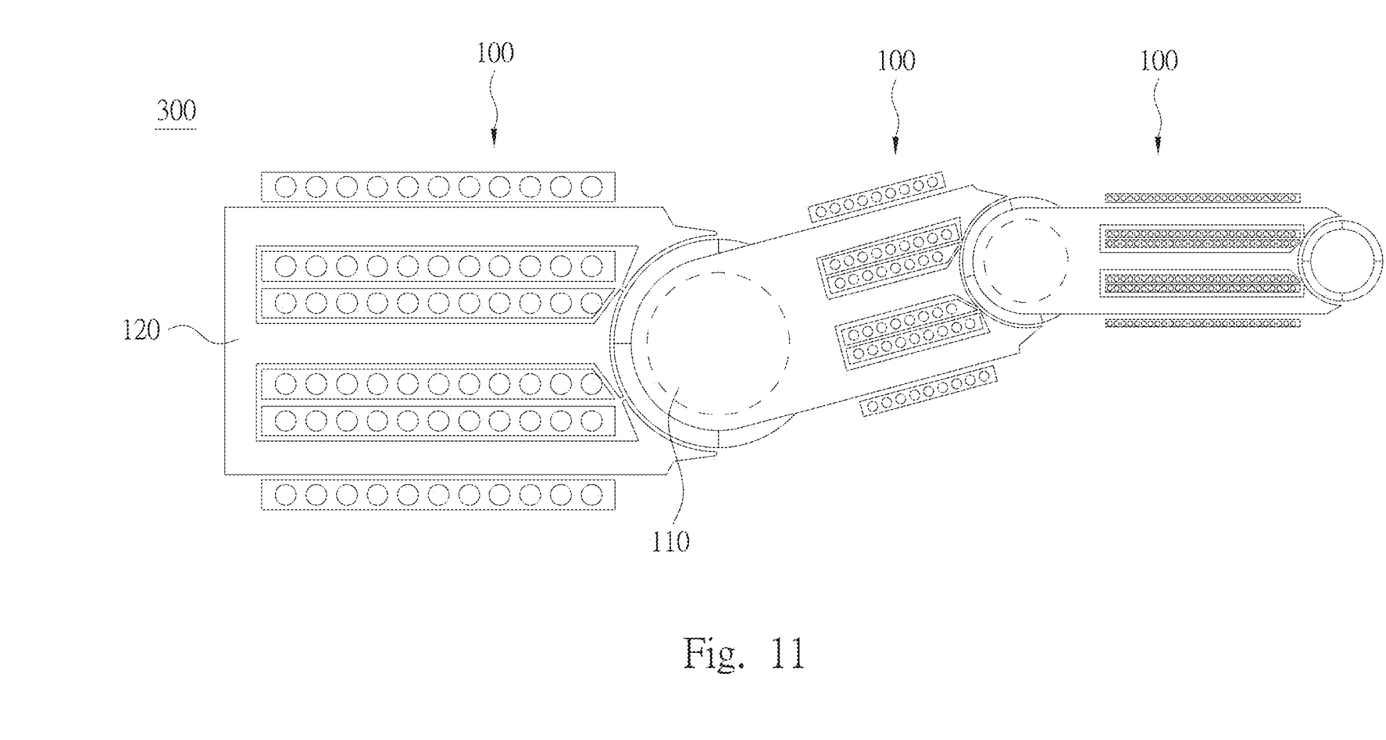
FIG. 11 is a schematic diagram of an embodiment of a robot arm utilizing the rotary motor in FIG. 5.

FIG. 11 is a schematic diagram of an embodiment of a robot arm utilizing the rotary motor in FIG. 5. The robot arm 300 comprises a plurality of the rotary motors 100 arranged in series, and each rotary motor 100 can provide an axial movement. A plurality of the rotary motors 100 can be arranged in series for allowing the robot arm 300 to undergo predetermined movements.

Since each rotary motor 100 has only one stator 120 and one rotor 110, compared to traditional solutions using an annular iron core, the rotary motor 100 in this disclosure is light in weight and does not utilize a large space. In addition, for the reduction of weight at the end of the robot arm 300, the dimensions of the rotary motors 100 can be increasingly reduced in sequence from one end to the other end, such that the rotary motor 100 at the base of the robot arm 300 has the largest dimensions and the rotary motor 100 at the opposite end of the robot arm 300 has the smallest dimensions.

The shape of the stator(s) and the relative positions of the stator(s) and the rotor of the rotary motor can be adjusted in the present disclosure, such that the rotary motor, and the power apparatus and the robot arm using the same may achieve a higher level of space utilization. Furthermore, a more flexible space utilization of the rotary motor, and the power apparatus and the robot arm using the same can be realized.

Although the present invention has been described in considerable detail with reference to certain embodiments thereof, other embodiments are possible. Therefore, their spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers the modifications and variations of this invention provided they fall within the scope of the following claims.

What is claimed is:

1. A power apparatus comprising:
   a hollow ring case; and
   a plurality of rotary motors assembled in the hollow ring case, each rotary motor of the plurality of rotary motors comprising:
      a rotor having a shaft; and
      at least one stator having an iron core and a coil wound around the iron core,
   wherein
      a cross section of the stator perpendicular to the shaft has a first axis tangential to the shaft, and a second axis crossing the first axis,
      the rotor is positioned on an extension line of the second axis,
      the cross section of the stator is arc-shaped, and
      the rotary motors of the plurality of rotary motors are in an annular arrangement.

2. The power apparatus of claim 1, wherein a length of the iron core along the first axis is shorter than a length of the iron core along the second axis.

3. The power apparatus of claim 1, wherein a length of the iron core along the first axis is longer than a length of the iron core along the second axis.

* * * * *